Figure 1:
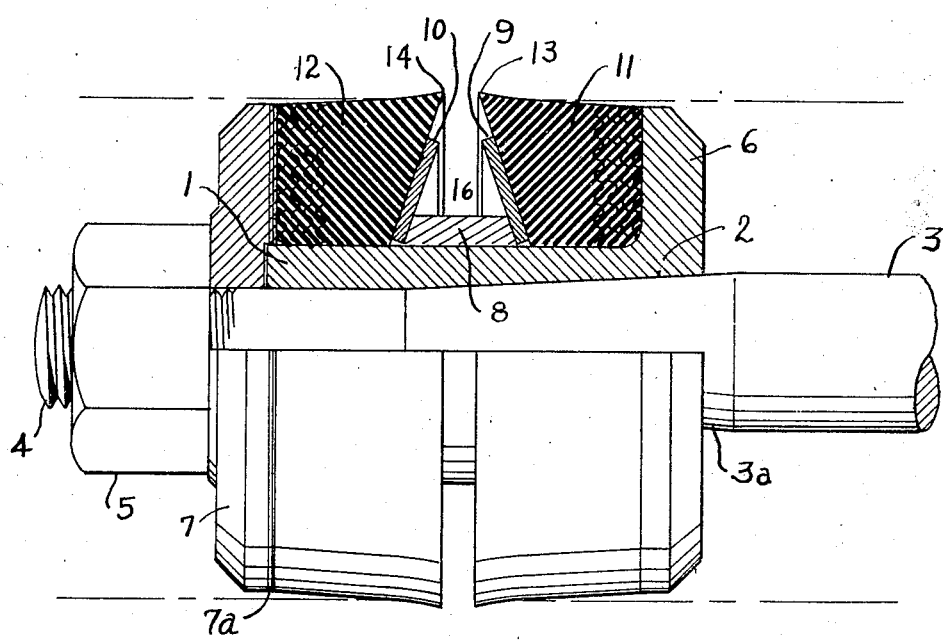

March 30, 1943.  T. S. PARK  2,315,012
PISTON
Filed May 15, 1941

Inventor
TRACY S. PARK

By
E V Hardway
Attorney

Patented Mar. 30, 1943

2,315,012

UNITED STATES PATENT OFFICE 2,315,012

PISTON

Tracy S. Park, Houston, Tex.

Application May 15, 1941, Serial No. 393,592

6 Claims. (Cl. 309—4)

This invention relates to a piston.

The piston has been particularly designed for use in slush pumps for pumping drilling fluid although this type of piston is capable of general use for pumping liquids.

An object of the invention is to provide a piston of the character described having replaceable rubbers forming seals with the pump liner and which are so mounted and maintained assembled that they may be readily renewed without removing the piston rod or piston body from the pump.

Another object of the invention is to provide a piston of the character described with the piston rubbers so mounted thereon that their sealing edges or lips will confront each other near the transverse center of the piston so that a much shorter pump liner can be used than would be possible with the type of pistons now in common use and without shortening the working stroke of the pump; furthermore, with the sealing lips near the center of the piston neither lip will be liable to pass beyond the end of the liner at the end of the piston stroke, thus protecting said rubbers against injury which would happen should the lips emerge from the ends of the liner as sometimes happens with pistons as now constructed.

A further object of the invention is to provide a piston of the character described having two independent rubbers, or seals, and two annular reenforcing plates, said seals and plates being identical and thus interchangeable.

Another object of the invention is to provide a piston of the character described which is so constructed that both sealing edges or lips of the rubbers, or seal rings, will be lubricated upon either working stroke or back stroke of the piston. Upon working stroke of the piston, the sealing edge or lip of the working piston rubber will be in contact with the lubricated wall of the liner, said wall being lubricated either by the liquid being pumped or by lubricant in the chamber between the piston rubbers, while the sealing edge of the non-working piston rubber, or seal, will travel over the liner wall which is lubricated by the liquid. Therefore, the sealing lip of the non-working piston rubber or seal will not be in frictional contact with a dry surface and will not be subject to the severe frictional wear that will occur where the surface of the liner wall over which it travels is dry. As commonly constructed at the present time, the sealing lips of pistons are oppositely directed and arranged near the ends of the piston so that the working piston rubber precedes the non-working rubber and wipes the wall of the liner dry in advance of the non-working rubber so that the latter moves in frictional contact with a dry wall and is therefore subjected to severe frictional wear. The particular arrangement and location of the sealing lips of the piston forming the present invention is one of the important features of the invention.

Another object of the invention is to provide a piston of the character described of such construction that the replaceable parts may be varied in size to form a piston of any required diameter.

It is a further object of the invention to provide a piston of the character described that is so constructed that it may be readily expanded, in case of necessity to take up for wear; also the piston is so constructed that it may be easily initially lubricated so that when the pump is started the piston will not operate in a dry cylinder prior to the time the flow of fluid is started through the pump.

While the invention has been particularly designed for use as a piston, it is also suitable for use for forming a seal between two concentric relatively removed parts.

Figure 2:
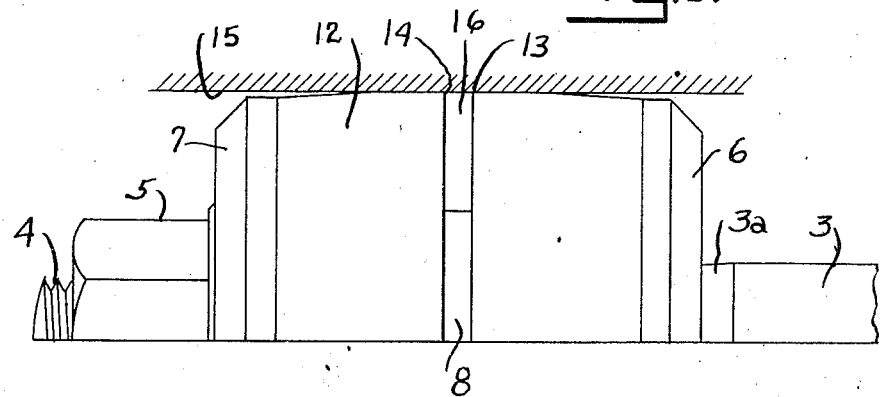

With the above and other objects in view the invention has particular relation to certain novel features of construction, operation and arrangement of parts, an example of which is given in this specification and illustrated in the accompanying drawing, wherein:

Figure 1 shows a side view of the piston, partly in section showing the sealing lips expanded, as they will be before insertion into the liner, said liner being indicated by dotted lines, and Figure 2 shows a fragmentary side view showing the lips as compressed within the pump liner.

Referring now more particularly to the drawing, wherein like numerals of reference designate similar parts in each of the figures, the numeral 1 designates the piston body which is approximately tubular in form having an axial bearing 2 therethrough which is tapered to receive the tapered end 3a of the piston rod 3. This piston rod terminates in a threaded end 4 to receive a clamp nut 5.

One end of the body has an external annular flange forming an end plate 6 and at the other end of the body there is a removable end plate 7 through which the piston rod extends and which is clamped in assembled relation with the body by means of the clamp nut 5. Around the body midway between the end plates there is a removable spacer ring 8 whose ends converge slightly outwardly and fitted against said outwardly converging ends and extending out radially beyond the ring 8 there are the annular reenforcing plates 9, 10 which converge outwardly.

Clamped between the end plates 6, 7 and the corresponding reenforcing plates 9, 10 are the annular piston rubbers 11, 12 which abut closely against the corresponding end plates 6, 7. When the piston rubbers become worn and require expansion, a shim, or shims, 7a, may be inserted between the end plates 7 and the rubber 12, as shown in Figure 1, and the nut 5 then further tightened up to cause the required expansion of the rubber to take up the wear.

The facing ends of the rubbers 11, 12 terminate in the forwardly directed annular flared lips 13, 14. These lips are somewhat greater in transverse diameter than the transverse diameter of the liner 15 in which the piston works but when inserted into the liner, the lips will be compressed, as shown in Figure 2, into close sealing relationship with the liner walls.

Upon installing a piston in a pump the annular chamber as 16, between the piston rubbers, may be filled with a lubricant so that when the pump is first started in operation the piston will be initially lubricated until it is lubricated by the liquid being pumped.

Upon working stroke of the piston the non-working rubber as, for example, the rubber 12 will move ahead of the working rubber as, for example, the rubber 11 and will move in contact with the liquid to which the force is applied and in contact with the wall of the liner which is lubricated by said liquid and the lip as 13 of the working rubber will also move in contact with the liquid being pumped and will move over a lubricated surface of the liner. Thus neither lip will move in contact with a liner wall that has been wiped dry by the piston rubber ahead. Upon movement of the piston in the other direction the rubber 11 will be the non-working rubber and the lips 13 will travel over a lubricated surface of the liner while the working lip 14 of the rubber 12 will work in contact with the liquid being pumped and will move over a lubricated surface. The frictional wear of the lips of the piston rubbers will thus be greatly reduced.

It is obvious that by moving the piston to the end of the liner the nut 5, the end plate 7 and the rubbers, reenforcing spaces and spacing ring can be readily removed and worn or broken parts replaced without removing the piston rod or the piston body from the pump.

The outer ends of the piston rubbers may be suitably reenforced by fabric embedded therein as is illustrated in Figure 1.

The drawing and description are illustrative merely while the broad principle of the invention will be defined by the appended claims.

What I claim is:

1. A pump piston comprising a piston body, a pair of seal rings around the body formed of resilient material and whose facing ends terminate in annular lips which are shaped to form seals with the pump liner in which the piston works and means removable from the body for maintaining said lips in spaced relation said means including annular reinforcing plates abutting the facing ends of said seal rings.

2. A pump piston comprising a piston body, seal rings around the body formed of resilient material whose facing ends terminate in forwardly diverging annular lips which are shaped to form seals with a pump liner, spacing means on the body between the seal rings, reinforcing annular plates clamped between the seal rings and the spacing means and means for clamping the seal ring assembly on the body.

3. A pump piston comprising a piston body, seal rings around the body formed of rubber, or the like, and whose facing ends terminate in annular lips which are shaped to form seals with the pump liner in which the piston works, a removable spacer ring around the body between the seal rings, annular, outwardly converging reinforcing plates around the body between the spacer ring and the respective seal rings and means for clamping the spacer ring, the reinforcing plates and the seal rings in assembled relation on the body.

4. A pump piston comprising a piston body having a fixed end plate at one end and a removable end plate at the other end, seal rings around the body abutting the respective end plates and formed of resilient material and whose facing ends terminate in forwardly diverging annular lips shaped to form seals with the pump liner, a removable spacer ring on the body between the seal rings, removable, outwardly converging, reinforcing plates on the body between the spacer ring and the respective seal rings and means for clamping the removable end plate against the ring assembly whereby said assembly will be securely clamped on the body with said annular lips spaced apart.

5. A pump piston comprising a piston body having a fixed end plate at one end and a removable end plate at the other end, annular seal rings around the body abutting the respective end plates and formed of resilient material, the inner ends of said seal rings terminating in forwardly diverging annular lips which are spaced apart and which face toward each other and are shaped to form seals with the pump liner and removable spacing means around the body between said seal rings which maintain said lips in spaced relation and means for clamping the removable end plate against the ring assembly whereby said assembly will be securely clamped on the body with the annular lips spaced apart.

6. A sealing assembly for forming a seal between two concentric relatively movable parts and comprising annular seal rings on one of said parts and formed of resilient material, the inner ends of said seal rings terminating in forwardly diverging annular lips which are spaced apart and which face toward each other and are shaped to form seals with the other of said relatively movable parts and removable spacing means between said seal rings which maintain said lips in spaced relation and means for clamping said sealing assembly in assembled relation.

TRACY S. PARK.